UNITED STATES PATENT OFFICE.

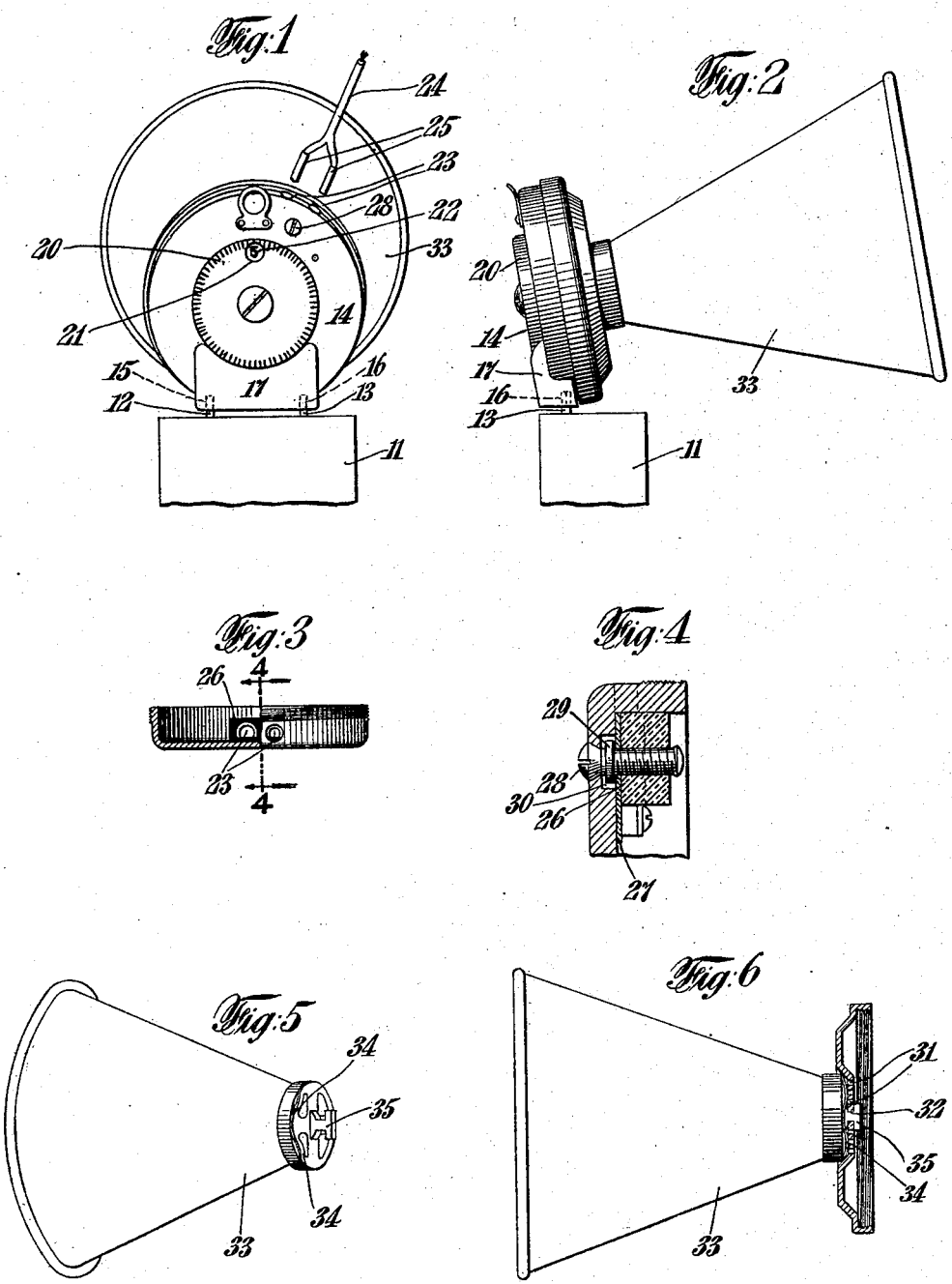

JOSEPH S. LEACH, OF BROOKLYN, NEW YORK.

APPARATUS FOR AIDING THE HEARING.

1,187,157.   Specification of Letters Patent.   Patented June 13, 1916.

Application filed March 20, 1915. Serial No. 15,844.

*To all whom it may concern:*

Be it known that I, JOSEPH S. LEACH, a subject of the King of England, and a resident of Brooklyn, in the county of Kings and State of New York, have invented certain new and useful Improvements in Apparatus for Aiding the Hearing, of which the following is a specification.

The invention relates to apparatus for persons with impaired hearing, said apparatus operating on the microphone principle.

It has for its object to simplify the manner of effecting the electrical connection between the transmitter and receiver thereof as well as to facilitate the substitution of the battery employed in connection therewith.

A further object of the invention is to afford a battery connection to the transmitter such that the latter will be maintained at the proper angle relative to the battery, when this is held in upright position, in order that the carbon pellets of the sensitive transmitter employed with apparatus of this character will not pack tight but remain sufficiently free, obviating thereby "howling" or "whistling" of said transmitter. The aforesaid electrical connections are such, moreover, that the exterior of the apparatus will not be marred; and, also, that danger of short-circuiting will be minimized. The connections, furthermore, are readily made and insure perfect contact. In case of a break in the connecting leads between transmitter and receiver, said leads may readily be removed and replaced as by merely turning a screw.

In the accompanying drawings which illustrate the invention—Figure 1 shows in rear elevation the transmitter and a portion of dry cell for operating the same and which latter is shown removably attached to the former. Fig. 2 is a side elevation. Fig. 3 is a fragmentary detail view of the connecting means for the conductors. Fig. 4 is a vertical section therethrough on an enlarged scale and taken on the line 4—4, Fig. 3. Fig. 5 is a perspective view and Fig. 6 a part cross-sectional view illustrating the manner of attaching the sound collector or mouth-piece to the transmitter when it is desirable to employ such mouth piece.

Similar characters of reference designate corresponding parts throughout the several views.

Referring to the drawings, 11 designates a cell, preferably of the dry type, and from whose upper surface extend two split metal posts 12 and 13, generally constructed to be of different diameter in order to insure proper polarity when the battery is connected to the transmitter 14 of the apparatus. These posts 11 and 12 form the terminals of the cell and their further connection to the interior of the transmitter mechanism is not shown and forms no part of the present invention, as the same is well understood in the art. Said posts, however, do not extend directly into the transmitter casing sockets or into metallic receptacles attached to the casing, but fit first into guide sockets 15 and 16 of a block 17 which is fixedly secured to the back of the transmitter. The portion of this block in which the said guide sockets are provided extends over the circumference of the transmitter and through which circumference the usual transmitter sockets (not shown) are accessible. This block is so positioned on the transmitter back or the inclination of the said sockets 15 and 16 therein is made such that the transmitter as a whole when thus attached to the cell 11 is maintained at a predetermined angle relatively to the said cell. This will cause the usual carbon pellets employed in sensitive microphone transmitters employed with the apparatus set forth not to pack tightly in their respective cups, whereby "howling" or "whistling" frequently caused thereby will be obviated. The details of the carbon transmitter, controlling rheostat, etc., of the transmitting mechanism and the receiver employed in connection therewith have not been shown in the drawings, since the construction and operation of the same is well understood in the art and forms no part of the present invention. To actuate the rheostat (located within the interior of the transmitter and not shown) a circular dial 20 is centrally mounted to rotate on the outside and back of transmitter 14 and is provided with an aperture 21 through which suitable characters 22, designating the resistance, or rather the tones, are successively visible as the said dial is rotated. This affords a convenient and compact means of adjustment.

Heretofore, various means have been employed to suitably secure the conductors to the transmitter terminals 23 and to the similar terminals of the receiver (not shown). As a rule, such connections when made directly to the interior of the transmitter are permanently secured or they are attached to the exterior of the transmitter, leaving more or less exposed portions through which short-circuiting may occur by laying down the apparatus, for example, upon a metallic surface or by some metallic object being laid across the same. Furthermore, to connect or disconnect these conductors from the apparatus a certain skill is required and frequently the apparatus is seriously affected when such removal or substitution is attempted by an inexperienced person. In the present embodiment, sockets 23 are provided through the casing into which is adapted to fit the ends of the conductors 24, and which are preferably provided with suitable metal caps 25 and preferably, also, of different diameters to insure proper polarity connections. These sockets extend through the casing and are formed in a movable block 26 of insulating material (Figs. 3 and 4) which rests upon an insulating plate 27 attached to the inner wall of the casing 14, the sockets in said block being open toward said plate. The head of a screw 28 projects through the top of the casing 14 and passes through block 26 and plate 27 being turned or spun over at its inner end. At its outer end, the said screw 28 is provided with a shoulder 29 which fits into a recess 30 of the transmitter casing and which recess is closed by the plate 27. The sockets, therefore, may be closed upon the said plate to securely hold the ends of the conductors by merely turning the readily accessible screw 28 in the proper direction; and, by reversing the motion of the said screw, the ends of the conductors may be released should it be desired to remove or replace the same. This affords a very simple means for connecting the conductor ends to the transmitter or receiver, it being understood that the proper internal connections are made from the sockets as is well understood. The exposed ends of the conductors are thus also insured against short-circuiting, being substantially within the casing.

The cover for the front of the transmitter is provided with a series of small perforations 31 at its central portion and with a slot 32 at the center. A flaring horn or sound collector 33 has secured at its smaller end a spring washer having intermediate raised circumferential spring pieces 34, and beyond this the horn is provided with a single locking piece or bar 35 which is adapted to fit the slot 32. The mouth piece or collector may thereby be attached to the said cover by inserting the locking piece 35 therein through the slot 32 and giving said mouth-piece or collector a quarter turn to prevent withdrawal of the same. The spring pieces 34 serve then to hold the collector to the cover by exerting the requisite pressure therebetween. To remove the collector, it is necessary merely to turn the same sufficiently to cause its locking piece 35 to register again with slot 32 and then withdraw the piece through the same.

I claim:—

1. In an apparatus for aiding the hearing, an instrument provided with suitable sockets to receive conductor ends, and locking means for said ends including an insulating plate secured to the interior of the instrument, a movable block provided with socket portions open toward the said plate between which and said blocks the conductor ends are to be clamped, and an adjusting screw passing through said plate and block and adapted, when rotated, to coöperate with the former to move the latter, said screw extending to the outside of the instrument casing.

2. In an apparatus for aiding the hearing, an instrument provided with suitable sockets to receive conductor ends, and locking means including an insulating plate secured to the interior of the instrument, a block provided with socket portions open toward the said plate, and an adjusting screw therefor, provided with a shoulder fitting a recess of said instrument closed by said plate, said screw passing through said plate and block and extending to the outside of the instrument and its inner end being turned over the said block.

Signed at New York, in the county of New York, and State of New York, this 18th day of March, A. D. 1915.

JOSEPH S. LEACH.

Copies of this patent may be obtained for five cents each, by addressing the "Commissioner of Patents. Washington, D. C."